United States Patent
Thippesh et al.

(10) Patent No.: US 9,769,233 B2
(45) Date of Patent: Sep. 19, 2017

(54) DISTRIBUTED MEDIA CLASSIFICATION ALGORITHM IN A SERVICE CONTROLLER PLATFORM FOR ENHANCED SCALABILITY

(71) Applicant: ARUBA NETWORKS, INC., Sunnyvale, CA (US)

(72) Inventors: Navaneetha Krishna Gowda Thippesh, Bangalore (IN); Brijesh Kumar Yadav, Bangalore (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 121 days.

(21) Appl. No.: 14/726,281

(22) Filed: May 29, 2015

(65) Prior Publication Data

US 2016/0352796 A1    Dec. 1, 2016

(51) Int. Cl.
*H04L 29/06* (2006.01)
*H04L 29/12* (2006.01)

(52) U.S. Cl.
CPC .......... *H04L 65/605* (2013.01); *H04L 65/608* (2013.01); *H04L 61/2575* (2013.01)

(58) Field of Classification Search
None
See application file for complete search history.

(56) References Cited

U.S. PATENT DOCUMENTS

| 7,228,550 B1* | 6/2007 | Eberhard | G06F 9/544 |
| | | | 709/231 |
| 7,864,764 B1* | 1/2011 | Ma | H04L 12/413 |
| | | | 370/389 |
| 7,870,279 B2* | 1/2011 | Chuang | H04L 29/06 |
| | | | 709/203 |
| 9,380,435 B2* | 6/2016 | Choi | H04W 4/16 |

(Continued)

OTHER PUBLICATIONS

Service-Aware Network Architecture Based on SDN, NFV, and Netwrok Intelligence, Intel While Paper, 2013.*

(Continued)

*Primary Examiner* — Hassan Kizou
*Assistant Examiner* — Deepa Belur
(74) *Attorney, Agent, or Firm* — Hewlett Packard Enterprise Patent Department

(57) ABSTRACT

A network system and the method is described that splits media identification logic and media classification and/or general data session processing/management logic into separate controllers (e.g., between the local controllers and a service controller). By separating media identification logic and media classification logic (or general media processing/management logic), the system and method allows for greater flexibility and scalability in a network system employing a service controller. In particular, by allowing the local controllers to perform media identification and to construct a single packet that characterizes/describes a media session, the system avoids the need to transmit multiple data packets of a media session to the service (Continued)

controller for classification of the session. Accordingly, the system includes the flexibility a service controller provides while allowing for greater scalability by separating media identification logic and media classification respectively between a local controller and the service controller.

26 Claims, 5 Drawing Sheets

(56) References Cited

U.S. PATENT DOCUMENTS

| | | | |
|---|---|---|---|
| 2011/0080940 A1* | 4/2011 | Bocharov | H04N 21/4331 375/240.01 |
| 2015/0346955 A1* | 12/2015 | Fundament | H04N 21/4821 715/765 |
| 2016/0134881 A1* | 5/2016 | Wang | H04N 19/436 375/240.02 |
| 2016/0241711 A1* | 8/2016 | Eilts | H04M 3/42042 |
| 2017/0083474 A1* | 3/2017 | Meswani | G06F 13/4234 |
| 2017/0111153 A1* | 4/2017 | Scholten | H04L 5/0053 |

OTHER PUBLICATIONS

White Paper Intel® Architecture Processors Qosmos* DPI Technology Networking and Communications; 2013 Intel Corporation.*

* cited by examiner

DISTRIBUTED MEDIA CLASSIFICATION ALGORITHM IN A SERVICE CONTROLLER PLATFORM FOR ENHANCED SCALABILITY

TECHNICAL FIELD

The present disclosure relates to a system that separates media identification and media classification between a local controller and a service controller. For example, in one embodiment, a local controller may generate a single packet that describes each stream in a session, which has been identified as a media session, and transmits the packet to a service controller for classification of the session. Other embodiments are also described.

BACKGROUND

A service controller may provide centralized control of one or more cloud services that are made available to client devices in a network system. The service controller has unprecedented abilities from a flexibility standpoint to manage services in the network system. In particular, new services may be added to the network system through configuration of the service controller. In this system, the local controller may identify media sessions and transmit packets for each identified media session to a service controller for classification of the session.

Although the service controller may provide increased flexibility for adding new services, scalability of this system in which the control plane is located within the service controller is problematic as each packet must be transmitted to the service controller for media classification. Accordingly, as more devices and controllers are added to the system, the overhead involved in transmitting packets from each local controller to the service controller for media classification processing increases as well.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
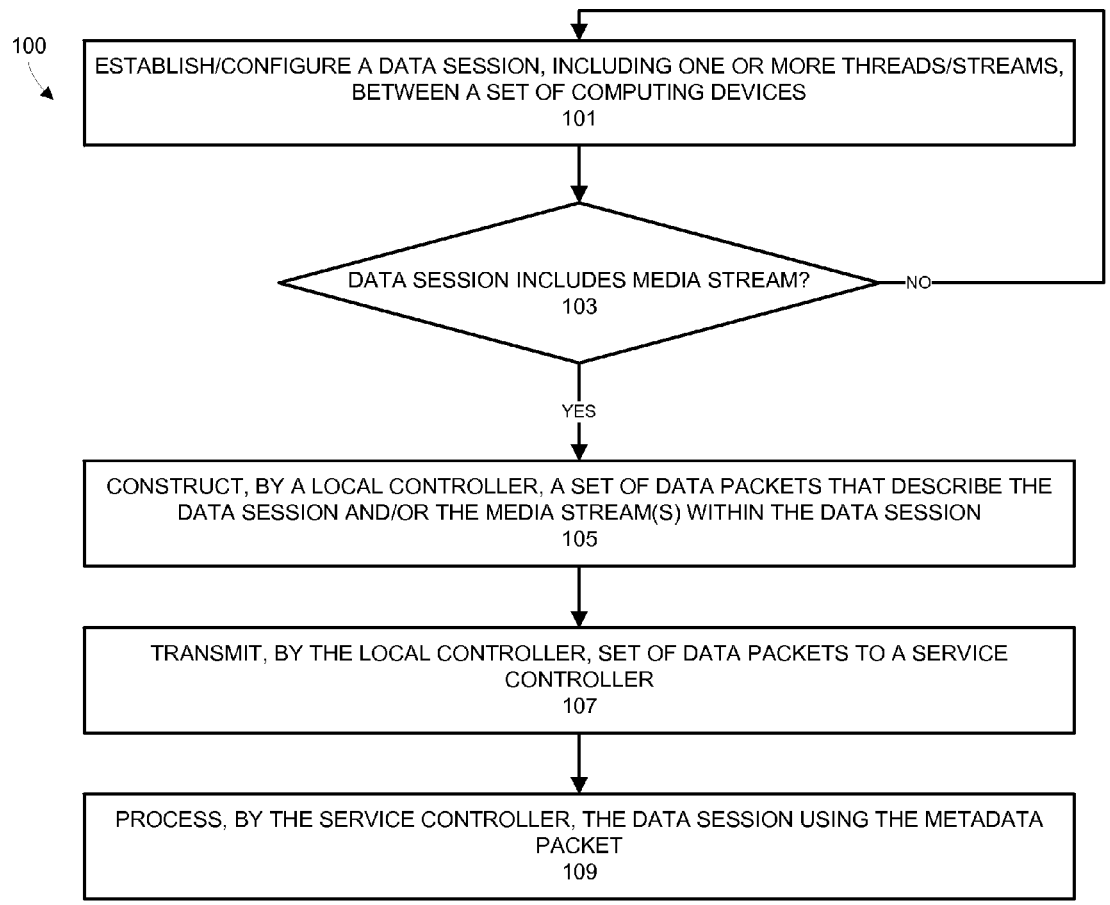
FIG. 1 shows a method for performing distributed media identification and classification according to one embodiment.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Overview

As will be described herein, systems and methods are proposed that perform media identification and media classification for a data session. The data session may include one or more separate streams that carry audio and video between client devices and other computing devices in the network system. In one embodiment, media identification is performed on a local controller within the network system. Media identification analyzes packets in a set of streams of a session to determine if one or more of the streams contain real-time media. This analysis may involve the use of deep packet inspection (DPI) of one or more of the packets in a stream.

Upon detecting that one or more streams within a data session are real-time media streams, the local controller may generate a single metadata packet that characterizes/describes the session. The single metadata packet may identify and record (1) the various streams of media within the session, (2) media formats of the streams (e.g., Real-time Transport Protocol (RTP), RTP control protocol (RTCP), etc.), (3) codec types used in each stream, and (4) application patterns/signatures detected/identified in each stream. This single packet may thereafter be transmitted to a service controller for performance of media classification and other processing. Media classification determines what application or media type is associated with the data session. For example, media classification logic within the service controller may determine that a session may correspond to a particular multimedia chat application (e.g., Google Hangouts) based on a media format/payload type of a set of streams in the data session and a set of signatures detected in the data session. In other embodiments, the metadata packet may be used for determining whether the data session contains audio, video, or audio and video. For example, this determination may be based on the codec detected in the data streams of the data session and recorded in the metadata packet. Based on the determination of media type, the service controller may adjust the prioritization of the data session through control of the corresponding local controller.

By separating media identification logic and media classification logic (or general session management logic), the system described herein allows for greater flexibility and scalability in a network system employing a service controller. In particular, by allowing the local controller to perform media identification and to construct a single packet that characterizes/describes a media session, the system avoids the need to transmit multiple data packets of a media session to the service controller for classification of the session. Instead, the local controller may transmit the single metadata packet to the service controller such that the service controller may perform classification and other session management functions for the session using the single metadata packet. Accordingly, the system provides the flexibility associated with a service controller while allowing for greater scalability by separating media identification logic and media classification logic between local controllers and a service controller.

Distributed Media Identification and Media Classification

FIG. 1 shows a method 100 for performing distributed media identification and classification according to one embodiment. The method 100 will be described in relation to the network system 200 shown in FIG. 2; however, in other embodiments, the method 100 may be similarly performed using other systems. As will be described in greater detail below, the method 100 performs media identification on local controllers 201 while performing media classification and/or other processing operations on a service controller 203. In particular, the media classification performed on the service controller 203 relies on a single metadata packet, which describes the streams in a data session and was received from an associated local controller 201. Accordingly, as will be described herein, through the use of a single metadata packet that characterizes/describes a data session, the method 100 reduces the overhead involved in media classification since data packets in each stream of a data session do not need to be forwarded to the service controller 203 for processing. Although the service controller 203 is described above in relation to media classification, in other embodiments, the service controller 203 may perform additional functions based solely on the metadata packet received from a local controller 201. For example, the service controller 203 may prioritize a data session based on a media type of the data session. For instance, a metadata packet for a data session may indicate that a particular audio codec is being used to encode media in the data session. Based on this codec information, the service controller 203 may conclude that the data session is an audio only call/session and assign priority accordingly.

The method 100 will now be described in greater detail below by way of example. Although shown and described in a particular order, the operations of the method 100 may be performed in a different order. For example, in some embodiments, two or more operations in the method 100 may be performed in at least partially overlapping time periods.

Figure 2:
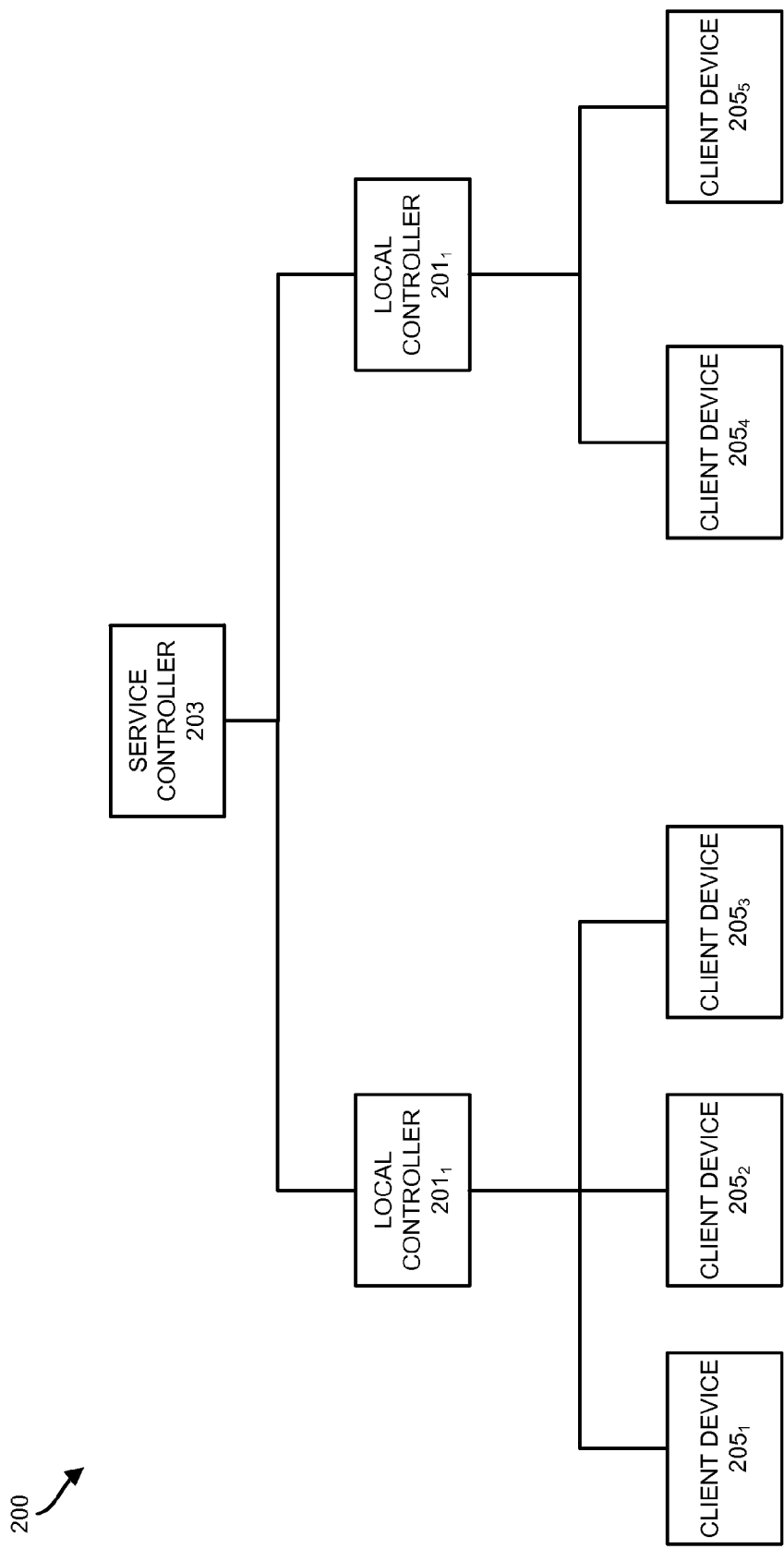
FIG. 2 shows a network system according to one embodiment.

In one embodiment, the method 100 may commence at operation 101 with the establishment and configuration of a data session between two computing devices. For example, the data session established at operation 101 may be between the client device $205_1$ and the client device $205_2$ in the network system 200. As shown in FIG. 2, the client devices $205_1$ and $205_2$ are associated with the local controller $201_1$ such that the data session established between the devices $205_1$ and $205_2$ flows through and may be managed by the local controller $201_1$. In one embodiment, the data session may be established and configured by applications running on the client devices $205_1$ and $205_2$. For example, audio/video chat applications running on respective client devices $205_1$ and $205_2$ may establish a data session at operation 101. Accordingly, the data session established at operation 101 represents an audio/video call between users of the client devices $205_1$ and $205_2$. In other embodiments, the data session may represent audio only or video only.

In one embodiment, the data session may include multiple data threads that are partitioned into separate respective virtual streams. For example, in the example provided above regarding audio/video chat applications running on the client devices $205_1$ and $205_2$, the data session established by these applications may include a video data stream and a separate audio data stream. These data streams may include a number of sequentially numbered data packets of a particular format or payload type (e.g., Session Traversal Utilities for NAT (STUN) packets, Real-time Transport Protocol (RTP) packets, RTP control protocol (RTCP) packets, etc.) and may include data that describes a codec being used to encode the multimedia data in the streams. For example, a single data session between the client devices $205_1$ and $205_2$ may include two streams that respectively use RTP and RTCP packets for audio and video threads. Further, packets in each of the streams may indicate a particular codec used to encode data in each stream.

Figure 3:
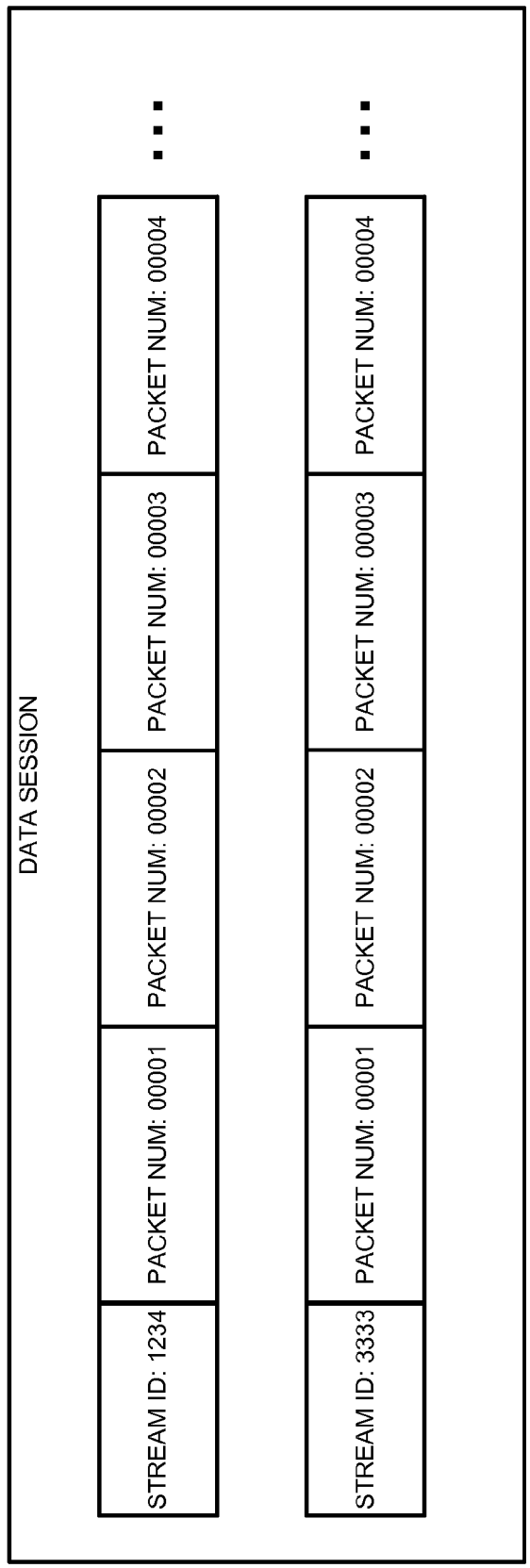
FIG. 3 shows a set of data streams for a single five-tuple data session according to one embodiment.

Each data stream may include a unique stream identifier (SSRC) and, as mentioned above, may be sequentially numbered even though each data stream is transported in the same five-tuple data session. For example, FIG. 3 shows a set of data streams for a single five-tuple data session. As shown, each data stream includes a separate stream identifier and each packet in each data stream includes a separate sequential packet number.

In one embodiment, the service controller 203 may manage one or more services utilized by the client devices $205_1$ and $205_2$. For example, the service controller 203 may manage one or more audio/video chat services provided in the network system 203. The service controller 203 may provide a variety of management functions, including the prioritization of sessions according to media type (e.g., audio, video, or audio/video). In this embodiment, the service controller 203 may transmit control data to corresponding local controllers 201 to implement/perform these management functions (e.g., prioritization levels transmitted to local controllers 201). As will be described in greater detail below, these management functions may be based on data received from the local controllers 201 that characterize or otherwise describe the data sessions controlled by the local controllers 201.

Following establishment of a data session between a set of computing devices (e.g., the client devices $205_1$ and $205_2$), a local controller 201 that manages the data session may attempt to determine/identity whether the data session is a media session at operation 103. In particular, the local controller 201 may determine whether the data session includes one or more real-time media streams (e.g., real-time audio and/or video).

In one embodiment, media identification involves extracting each stream from a data session and monitoring a predefined number packets of each stream. For example, in one embodiment, the first nine packets of each stream of a data session may be examined to determine whether the stream contains real-time media at operation 103. In other embodiments, the number of packets monitored in each stream may be different. In one embodiment, media identification may include determining whether the packets in a stream are from a known real-time media delivery format (e.g., STUN, RTP, and RTCP). This determination may be performed by determining whether the predefined number of packets in a stream are properly sequenced (e.g., the first nine packets in a particular stream are numbered in sequential order).

When the analyzed packets in each stream are not from a known real-time media format (e.g., not sequentially numbered), operation 103 may determine that the data session is not a real-time data session and may stop examining and recording packets in this data session. By identifying/determining that a stream/session contains real-time media based on the format/payload type, the system 200 provides greater flexibility with minimal need for reconfiguration as new services are added to the system 200. Namely, as services are added to the service controller 203, these additions will not affect the media identification operations of the local controller (i.e., the format/payload types known to transmit real-time media should not be altered based on added services to the service controller 203). Further, by stopping the examination of a data session after revealing that the session does not include known real-time packets in a prescribed format (e.g., sequential), the method 100 may prevent security issues that are caused by sessions that include malicious code with real-time media data.

In some embodiments, the number of streams to be processed during media identification may be limited. For example, in some embodiments, the number of streams to be processed may be limited to four, five, or six streams. In practice, the number of streams is typically limited to four, five, or six streams for real-time media sessions. Accordingly, the method 100 may avoid examining sessions with greater numbers of streams than the identified limit.

When it is determined at operation 103 that the data session is not a media session (i.e., none of the streams within the data session contain real-time media), the method 100 may return to operation 101 to wait for another data session to be established between computing devices. Conversely, upon determining that the data session is a media session (e.g., one or more streams within the data session contain real-time media), the method 100 may move to operation 105.

At operation 105, the local controller 201 may construct a single metadata packet that characterizes/describes the real-time data session identified at operation 103. As will be described below, the metadata packet constructed by the local controller 201 may be used by the service controller 203 for classifying the data session or performing other session management operations. Although described herein as generation of a single metadata packet, in other embodiments, the local controller 201 may generate a set of data packets that characterize/describe the real-time media within the data session, wherein the set includes two or more metadata packets. However, regardless of the number, the metadata packets generated at operation 105 are separate from the packets that form the streams of the data session.

The metadata packet that describes the real-time data session may include various pieces of data. In one embodiment, this data within the metadata packet includes the format or payload type of the data packets in each of the streams within the data session. For example, a data session may include two streams that have been identified at operation 103 as containing real-time media. In this example, the first data stream may include RTP packets while the second data stream may include RTCP packets. Accordingly, the metadata packet that describes the real-time media within the data session would indicate that the data session includes a first data stream that includes RTP packets and a second data stream that includes RTCP packets.

Other examples of format information that may be added to the metadata packet include that an application associated with the data session sends (1) a STUN packet followed by media traffic; (2) RTP packets without STUN packets; (3) RTCP packets by themselves; (4) STUN, RTP, RTCP, and RTP packets in corresponding streams within the session; (5) audio and video in separate sessions; and (6) audio and video multiplexed over the same session.

In one embodiment, the data within the metadata packet may include a codec used to encode real-time media in streams within the data session. For example, each of the streams may include metadata (i.e., in a packet header) that indicates the codec used by an associated application to encode the media within the stream. In some embodiments, the metadata packet may include one or more of (1) the name of the codec for each stream; and/or (2) the version number of the codec for each stream. This codec information may be useful for identifying a media type (e.g., audio, video, or audio and video) present in a data session. Accordingly, this information may be included in the metadata packet at operation 105.

In one embodiment, the data within the metadata packet may include patterns/signatures within data streams of the data session. In particular, some applications may embed a unique signature within packets of a data stream. For example, Microsoft Lync packets may include CANDIDATE_ID and IMPL_VERSION attributes in STUN packets of an associated stream. Accordingly, these attributes may be recorded and included in the metadata packet at operation 105 as they will be useful for identifying the Microsoft Lync application during media classification. In one embodiment, the local controller 201 may include a set of known attributes and other signature profiles that are useful in identifying a particular application/service. These preconfigured attributes and signature profiles may be compared against packets of each stream to detect a match, which will be recorded and included in the metadata packets generated at operation 105 upon detection.

Following generation of the metadata packet at operation 105, the local controller 201 that generated the metadata packet may transmit this packet to the service controller 203 at operation 107. The transmission may be performed using any known wireless or wired networking protocol or standard.

Although the operations 103, 105, and 107 described above have been discussed in relation to a single data session and a single local controller 201, these operations 103, 105, and 107 may be simultaneously performed on multiple data sessions on the same local controller 201 and/or on separate local controllers 201. Accordingly, the service controller 203 may receive a separate metadata packet for each data session operating within the network system 200.

Following receipt of a metadata packet, the service controller 203 may process the metadata packet for the data session at operation 109. In one embodiment, the processing may include (1) determining a call/media type (e.g., the data session includes audio, video, or both audio and video) for the real-time data session; (2) classifying/matching the data session to an application/service (e.g., Google® Hangouts™, Microsoft® Lync®, Apple® Facetime®, etc.); and (3) reprogramming the flows/connections on the local controller 201 according to the call type and/or an associated application/service (e.g., reprogram the flows/connections for the data session to match preconfigured settings corresponding to the call type and/or an associated application/service). In other embodiments, other processing operations may be performed by the service controller 203 at operation 109.

In one embodiment, determining a call/media type (e.g., the data session includes audio, video, or both audio and video) is performed by examining codec information within the metadata packet. Namely, the service controller 203 may determine that the data session includes only audio when only an audio codec is recorded in the metadata packet or that the data session includes only video when only a video codec is recorded in the metadata packet. Similarly, when both audio and video codecs are recorded in the metadata packet, the service controller 203 may determine that the data session includes both audio and video. This call/media type information may be used by the service controller 203 to manage a priority level of the data session. In particular, the service controller 203 may trigger the corresponding local controller 201 to alter a priority of the data session to meet a preconfigured set of call/media type priority levels.

For instance, an audio call/session may be given a higher priority in comparison to an audio/video call/session. However, in other embodiments, different priorities may be assigned.

In one embodiment, an application/service may be matched with the data session by comparing (1) the format or payload type of the streams in the data session and/or (1) the signatures detected within the data session against a set of known application/services and corresponding formats/payloads and/or signatures at operation 109. For example, a Microsoft Lync application/service may be associated with STUN packets that include CANDIDATE_ID and IMPL_VERSION attributes. Accordingly, upon processing a metadata packet that includes data indicating that STUN packets in the session include CANDIDATE_ID and IMPL_VERSION attributes, the service controller 203 may determine that the data session is associated with a Microsoft Lync application/service. Based on this classification, the service controller 203 may perform one or more management functions, including adjusting network parameters for the data session and/or computing metrics for the network system 200.

As described above, the network system 200 and the method 100 split media identification logic and media classification and/or general data session processing/management logic into separate controllers (e.g., between the local controllers 201 and the service controller 203). By separating media identification logic and media classification logic (or general media processing/management logic), the system 200 described herein allows for greater flexibility and scalability in a network system 200 employing a service controller 203. In particular, by allowing the local controllers 201 to perform media identification and to construct a single packet that characterizes/describes a media session, the system 200 avoids the need to transmit multiple data packets of a media session to the service controller 203 for classification of the session. Instead, the local controllers 201 may transmit the single packet to the service controller 203 such that the service controller 203 may perform classification or other service management processing of the session using the single packet. Accordingly, the system 200 includes the flexibility a service controller 203 provides while allowing for greater scalability by separating media identification logic and media classification respectively between a local controller 201 and the service controller 203.

Returning to FIG. 2, each component of the network system 200 will be described. Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 4:
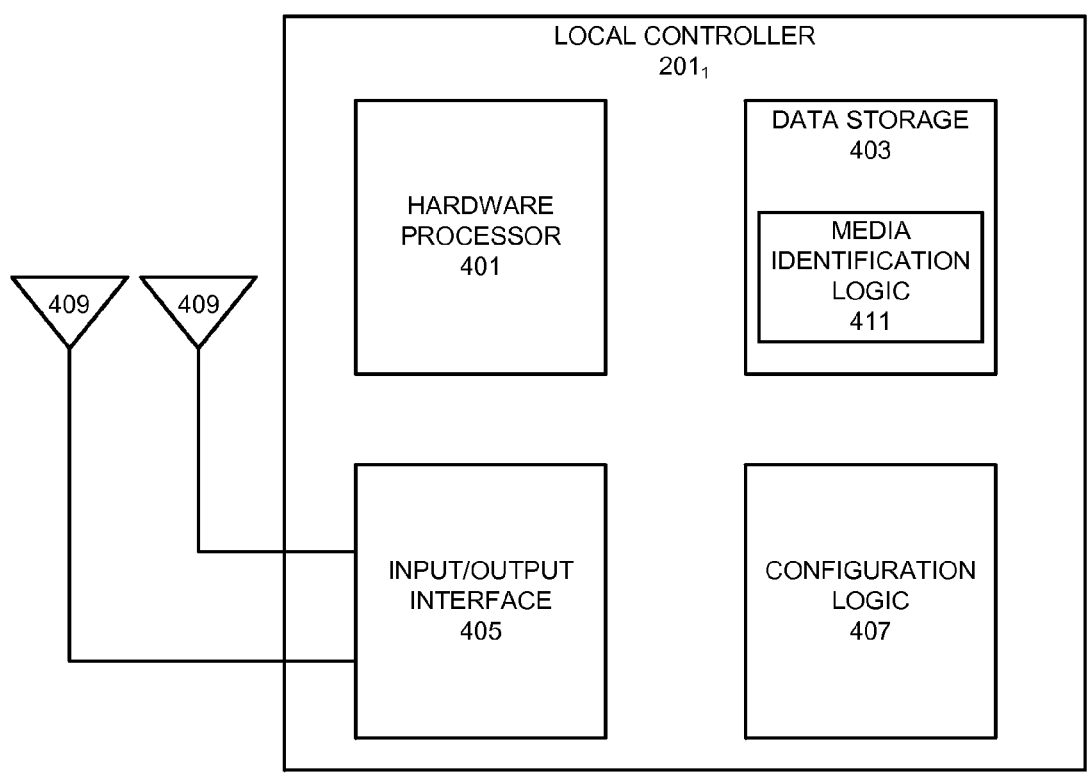
FIG. 4 shows a component diagram of a local controller of the network system according to one embodiment.

FIG. 4 shows a component diagram of the local controller $201_1$ according to one embodiment. The local controller $201_1$ may be any digital device that is capable of identifying media sessions and constructing a metadata packet for the data sessions as described above in relation to the method 100. As shown, the local controller $201_1$ comprises one or more of: a hardware processor 401, data storage 403, an input/output (I/O) interface 405, and device configuration logic 407. Each of these components of the local controller $201_1$ will be described in further detail below by way of example.

The data storage 403 of the local controller $201_1$ may include a fast read-write memory for storing programs and data during operations and a hierarchy of persistent memory, such as Read Only Memory (ROM), Erasable Programmable Read Only Memory (EPROM,) and/or Flash memory for example, for storing instructions and data needed for the startup and/or operation of the local controller $201_1$. For example, as shown in FIG. 4, the data storage 403 may include media classification logic 411 that may be executed by the hardware processor 401. The media classification logic 411 may identify media sessions and generate a single metadata packet for each session according to the method 100 described above. In one embodiment, the data storage 403 is a distributed set of data storage components.

In one embodiment, the I/O interface 405 corresponds to one or more components used for communicating with other devices (e.g., the client devices $205_1$-$205_5$, the service controller 203, and/or other devices in the system 200) via wired or wireless signals. The I/O interface 405 may include a wired network interface such as an IEEE 802.3 Ethernet interface and/or a wireless interface such as an IEEE 802.11 WiFi interface and corresponding antennas 409. The I/O interface 405 may facilitate communications with the client devices $205_1$-$205_5$, the service controller 203, and/or other devices in the system 200 over corresponding wired or wireless connections.

In one embodiment, the hardware processor 401 is coupled to the data storage 403 and the I/O interface 405. The hardware processor 401 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 407 includes one or more functional units implemented using firmware, hardware, software, or a combination thereof. In some embodiments, the configuration logic 407 may be used for configuring parameters of the gateway device $201_1$. For example, the device configuration logic 407 may identify media sessions and generate a single metadata packet for each session according to the method 100 described above in conjunction or apart from the media configuration logic 411.

Although the local controller $201_1$ is described above, in some embodiments, the local controller $201_2$ may be similarly configured and designed. In particular, the local controller $201_2$ may comprise one or more of: a hardware processor 401, data storage 403, an input/output (I/O) interface 405, and device configuration logic 407 such that the local controller $201_2$ may identify media sessions and generate a single metadata packet for each session as described above in the method 100.

Figure 5:
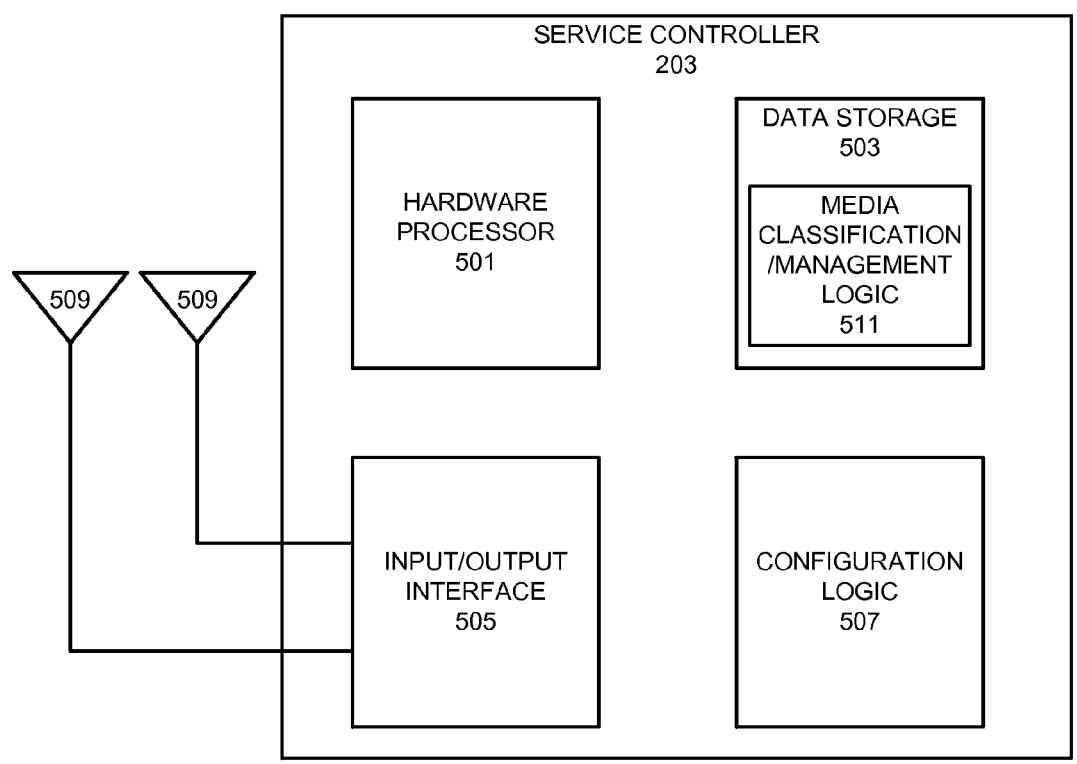
FIG. 5 shows a component diagram of a service controller of the network system according to one embodiment.

In one embodiment, the service controller 203 may be similarly configured and designed in comparison to the local controller $201_1$. In particular, as shown in FIG. 5 the service controller 203 may comprise one or more of: a hardware processor 501, data storage 503, an input/output (I/O) interface 505, and device configuration logic 507. In one embodiment, the data storage 503 may include media classification/management logic 511 that is configured to perform media classification and/or other session management operations as described above in the method 100.

In one embodiment, the client devices $205_1$-$205_5$ may be any wired or wireless digital device capable of receiving and transmitting data over wired or wireless mediums. Similar to the local controller $201_1$, the client devices $205_1$-$205_5$ may comprise one or more of: a hardware processor 401, data storage 403, an input/output (I/O) interface 405, and device configuration logic 407 such that the client devices $205_1$-$205_5$ may operate according to the method 100 described above. In particular, the client devices $205_1$-$205_5$ may include one or more applications for establishing data sessions between other client devices $205_1$-$205_5$ in the network system 200.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages is applicable.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   detecting, by a local controller, a data session between a plurality of computing devices;
   determining, by the local controller, that the data session includes real-time media;
   in response to determining that the data session includes real-time media, constructing a metadata packet, by the local controller, that describes the data session and is separate from data packets within the data session;
   transmitting the metadata packet to a service controller for media classification of the data session by the service controller based on the metadata packet; and
   in the local controller, receiving control data transmitted by the service controller to control the data session based on the classification by the service controller.

2. The method of claim 1, wherein the data session is a five-tuple session that includes one or more threads that are partitioned into separate respective virtual streams.

3. The method of claim 2, wherein determining that the data session includes real- time media comprises detecting that a virtual stream within the data session includes a predefined number of data packets that are (1) of a format known by the local controller to be associated with real-time media and (2) are sequentially numbered within the virtual stream.

4. The method of claim 3, wherein the formats known by the local controller to be associated with real-time media include one or more of Session Traversal Utilities for Network address translation (STUN), Real-time Transport Protocol (RTP), and RTP control protocol (RTCP).

5. The method of claim 2, wherein the metadata packet is constructed to include a format of packets within the one or more virtual streams within the data session.

6. The method of claim 2, wherein the metadata packet is constructed to include information describing a codec associated with a virtual stream of the data session.

7. The method of claim 2, wherein the metadata packet is constructed to include one or more predefined signatures that are detected within a virtual stream of the data session, wherein the predefined signatures are associated with a corresponding application or service.

8. The method of claim 1, wherein media classification of the data session comprises associating the data session with an application or service based on a comparison of one or more pieces of data in the metadata packet and characteristics of the application or service.

9. A non-transitory computer readable medium comprising instructions which, when executed by one or more hardware processors of a local controller operating in a network system, cause the local controller to:
   detect a data session between a plurality of computing devices;
   determine that the data session includes real-time media;
   in response to determining that the data session includes real-time media, construct a metadata packet that describes the data session and is separate from data packets within the data session;

transmit the metadata packet to a service controller for media classification of the data session by the service controller; and receive data from the service controller to control the data session based on the media classification by the service controller.

10. The non-transitory computer readable medium of claim 9, wherein the data session is a five-tuple session that includes one or more threads that are partitioned into separate respective virtual streams.

11. The non-transitory computer readable medium of claim 10, wherein determining that the data session includes real-time media comprises detecting that a virtual stream within the data session includes a predefined number of data packets that are (1) of a format known by the local controller to be associated with real-time media and (2) are sequentially numbered within the virtual stream.

12. The non-transitory computer readable medium of claim 11, wherein the formats known by the local controller to be associated with real-time media include one or more of Session Traversal Utilities for Network address translation (STUN), Real-time Transport Protocol (RTP), and RTP control protocol (RTCP).

13. The non-transitory computer readable medium of claim 10, wherein the metadata packet is constructed to include a format of packets within the one or more virtual streams within the data session.

14. The non-transitory computer readable medium of claim 10, wherein the metadata packet is constructed to include information describing a codec associated with a virtual stream of the data session.

15. The non-transitory computer readable medium of claim 10, wherein the metadata packet is constructed to include one or more predefined signatures that are detected within a virtual stream of the data session, wherein the predefined signatures are associated with a corresponding application or service.

16. The non-transitory computer readable medium of claim 9, wherein media classification of the data session comprises associating the data session with an application or service based on a comparison of one or more pieces of data in the metadata packet and characteristics of the application or service.

17. A local network controller, comprising:
a hardware processor;
a memory unit, including media identification logic to:
detect a data session between a plurality of computing devices;
determine that the data session includes real-time media;
in response to determining that the data session includes real-time media, construct a metadata packet that describes the data session and is separate from data packets within the data session;

transmit the metadata packet to a service controller for analysis of the data session by the service controller based on the metadata packet; and receive control data from the service controller to control the data session based on the analysis of the metadata packet by the service controller.

18. The local network controller of claim 17, wherein the data session is a five-tuple session that includes one or more threads that are partitioned into separate respective virtual streams.

19. The local controller of claim 18, wherein determining that the data session includes real-time media comprises detecting that a virtual stream within the data session includes a predefined number of data packets that are (1) of a format known by the local network controller to be associated with real-time media and (2) are sequentially numbered within the virtual stream.

20. The local controller of claim 19, wherein the formats known by the local network controller to be associated with real-time media include one or more of Session Traversal Utilities for Network address translation (STUN), Real-time Transport Protocol (RTP), and RTP control protocol (RTCP).

21. The local controller of claim 18, wherein the metadata packet is constructed to include a format of packets within the one or more virtual streams within the data session.

22. The local controller of claim 18, wherein the metadata packet is constructed to include information describing a codec associated with a virtual stream of the data session.

23. The local controller of claim 18, wherein the metadata packet is constructed to include one or more predefined signatures that are detected within a virtual stream of the data session, wherein the predefined signatures are associated with a corresponding application or service.

24. The local controller of claim 17, wherein media classification of the data session comprises associating the data session with an application or service based on a comparison of one or more pieces of data in the metadata packet and characteristics of the application or service.

25. The method of claim 1, wherein:
the service controller determines a call type or a media type associated with the data session; and
the control data comprises data to reprogram a flow or reprogram a connection associated with the local controller in response to the determined call type or determined media type.

26. The method of claim 1, wherein the control data comprises data to control a prioritization of the data session.

* * * * *